Nov. 8, 1938.　　　D. C. BARDWELL ET AL　　　2,135,693
PROCESS FOR THE PRODUCTION OF HYDROGEN
Filed Sept. 25, 1930
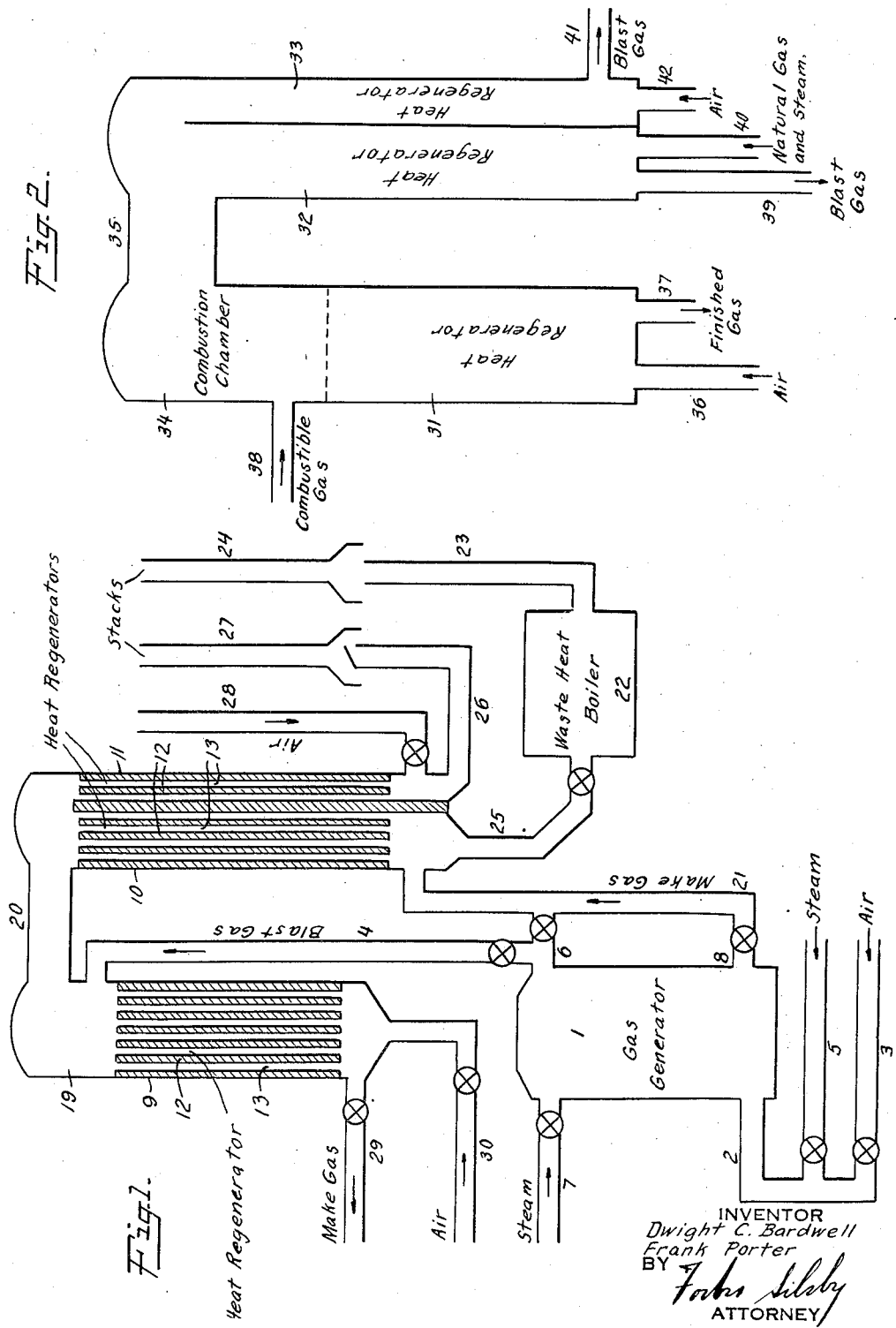
INVENTOR
Dwight C. Bardwell
Frank Porter
BY
ATTORNEY Patented Nov. 8, 1938

2,135,693

UNITED STATES PATENT OFFICE 2,135,693

PROCESS FOR THE PRODUCTION OF HYDROGEN

Dwight C. Bardwell and Frank Porter, Syracuse, N. Y., assignors, by mesne assignments, to The Solvay Process Company, New York, N. Y., a corporation of New York Application September 25, 1930, Serial No. 484,268

3 Claims. (Cl. 23—212)

This invention relates to a process and apparatus for the production of a combustible gas substantially free from hydrocarbons from a gas containing hydrocarbons. More particularly, this invention relates to a process for the production of a gas containing hydrogen and nitrogen by the decomposition of the hydrocarbon content of a combustible gas in the presence of air.

It has heretofore been proposed to prepare a gas containing hydrocarbons by treating a heated bed of bituminous fuel with steam and then to pass the resulting gaseous products in contact with heated refractory material to decompose the hydrocarbons. It has also been proposed to decompose a hydrocarbon gas, such as natural gas, by passing it in contact with refractory material previously heated by burning a portion of natural gas in direct contact therewith or to incompletely burn natural gas with air or oxygen in limited amounts to produce a gas containing hydrogen and carbon monoxide with or without nitrogen. The processes heretofore proposed have not been found suitable for the preparation by the reaction of a hydrocarbon gas with steam of a hydrogen gas which is to be employed in industrial processes, such as the synthesis of ammonia, where an exceedingly high degree of purity of the gas is a requisite. In an ammonia synthesis process, for example, where the synthesis gases are passed over a catalyst and after removal of ammonia product, the residual uncombined gases are recirculated in a cyclic system into renewed contact with the catalyst, a content of about 0.5% of hydrocarbon in the hydrogen-nitrogen gas introduced into the synthesis is substantially the upper limit of this impurity which is permissible for economic operation of the process. The gaseous products from the above processes contain residual undecomposed hydrocarbon in an amount which renders them unsatisfactory for use in the synthesis of ammonia therefrom.

It is an object of this invention to provide a process and apparatus for the thermal decomposition in the presence of steam of the hydrocarbon content of a gas containing the same in which the requisite high temperature for the production of a gas substantially free from hydrocarbon may be attained and maintained in an efficient manner. It is a further object of this invention to provide a process and apparatus for the treatment of bituminous fuel, such as bituminous coal or coke containing a relatively high proportion of hydrocarbon with steam to produce a hydrocarbon-containing gas and for the decomposition of this hydrocarbon to produce a combustible gas substantially free from the same. It is a further object of this invention to provide an efficient process for the production of a hydrogen-nitrogen gas suitable for catalytic synthesis of ammonia therefrom from a gas containing hydrocarbons, such as natural gas or water gas, produced from bituminous fuel. Other objects of the invention will in part be obvious and will in part appear hereinafter.

In order to decompose the hydrocarbon content of a gas containing the same, together with steam, such as that obtained from the treatment of bituminous fuel or natural gas to produce a product in which the hydrocarbon content is less than about 0.5%, the hydrocarbon content of the gas should be exposed to a temperature of about 1500° C. While it is well known that if a hydrocarbon gas is heated to much lower temperatures, for example temperatures in the neighborhood of 1000° C. for a sufficient period of time, that the hydrocarbon will decompose to yield a product containing less than 0.5% of residual undecomposed hydrocarbon, the decomposition reaction at such relatively low temperatures is exceedingly slow and we have discovered that for the practical commercial decomposition in the presence of steam of the hydrocarbon content of a gas to obtain a product containing not more than 0.5% of undecomposed hydrocarbon, that the decomposition reaction takes place with sufficient rapidity only when temperatures of about 1500° C. are employed. We have further discovered that the requisite high temperatures may be attained by preheating the hydrocarbon gas and air by means of the sensible heat contained in the products of combustion of a combustible gas with preheated air, and that the requisite preheat for the air may be obtained by transferring sensible heat of the gases obtained by the high temperature thermal decomposition of hydrocarbon in the presence of air to the air employed for the burning of the combustible gas for the preheating of a subsequent portion of hydrocarbon gas and air. We have further discovered that by burning a combustible gas with preheated air in contact with a body of refractory material to heat the same to a high temperature, and then separately preheating air and a mixture of hydrocarbon gas and steam by passing them in contact with the thus heated refractory material, that upon mixing the thus preheated hydrocarbon gas and air, the combustion of a portion of the hydrocarbon by means of the air raises the temperature of the mixture of gases to a temperature at which the unburned hydrocarbon content is substantially completely decomposed and that the high temperature reaction may be maintained to permit of commercial production of a hydrocarbon-free gas.

In carrying out this invention, a combustible gas is burned with preheated air and sensible heat contained in the products of combustion is transferred in part to a hydrocarbon gas, for example natural gas, coal gas, or water gas prepared from bituminous fuel, in part to steam and in part to air to preheat the same to a high temperature. The thus preheated hydrocarbon gas, steam and air are mixed, and the resulting combustion of a portion of the constituents results in the elevation of the temperature of the mixture of gases to a point at which the remaining unburned hydrocarbon is substantially completely decomposed in the presence of the steam to form carbon monoxide and hydrogen. The hot reaction product is cooled and the heat abstracted employed for the preheating of the air used for burning another portion of the combustible gas to supply the necessary preheat to the hydrocarbon gas, steam and air, as described above.

In its preferred embodiment, the invention comprises heating a bed of bituminous fuel by combustion of a portion of the fuel with air. The hot blast gases are mixed with sufficient preheated air to burn the combustible gas contained therein and the hot products of combustion divided and each portion passed through a separate body of refractory material to which the sensible heat of the gases is transferred. The air blast is then discontinued and steam is introduced into and passed through the heated fuel bed. The water gas thus formed and containing substantial proportions of hydrocarbons is passed through one of the aforesaid heated bodies of refractory material and thereby heated. Air is passed through the other body of hot refractory material to preheat it and the air and heated water gas mixed in such proportions that after combustion of a portion of the hydrocarbon gas and the reaction of the remaining unburned hydrocarbon and steam, a product containing substantially one volume of nitrogen to every three volumes of hydrogen and carbon monoxide taken together is produced. The hot reaction products are then passed through a body of refractory material to which they give up sensible heat and they are then passed to any desired treatment. When the temperature of the fuel bed is decreased to a point at which the steam is no longer efficiently decomposed by the hot fuel, the introduction of steam is discontinued and the fuel bed again heated as described above by means of an air blast and the air employed for burning the blast gases is preheated by being passed in contact with the body of refractory material to which the gaseous product from the decomposition of the hydrocarbon with steam and air described above had previously given up sensible heat.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of this invention, reference should be had to the following detailed description taken in conjunction with the accompanying drawing.

In the drawing,

Fig. 1 illustrates a process for the production of a hydrogen gas from bituminous fuel; and Fig. 2 illustrates a process for the production of a hydrogen gas by the decomposition of a hydrocarbon gas, such as natural gas.

Referring now to Fig. 1 of the drawing, the numeral 1 indicates a water gas generator of well known design provided with a pipe 2 entering the bottom of the generator whereby air from a pipe 3 may be blasted through the bed of fuel and the hot blast gases taken off from the top of the generator through a pipe 4 and in another period of operation steam from the pipe 5 may be introduced into the bottom of the fuel bed and the water gas generated by reaction of the steam in the fuel bed taken off from the top of the generator through a pipe 6. The generator is also provided with a pipe 7 for introducing steam into the top of the generator and pipe 8 for removing the gaseous products from the bottom of the generator. Numerals 9, 10 and 11 indicate three heat regenerators containing a refractory material 12. Refractory material 12 may consist of bricks laid in the regenerators as a checker work. Referring again to Fig. 1, pipe 4 enters regenerator 9 above the packing contained therein. The top portion of this regenerator serves as a combustion chamber 19. A pipe 20 leads from combustion chamber 19 to the tops of regenerators 10 and 11. Pipes 6 and 8 communicate with a pipe 21 which leads to the bottom of regenerator 10. The bottom of regenerator 10 is in communication with waste heat boiler 22, pipe 23, and stack 24 by means of pipe 25. A pipe 26 communicates between the bottom of regenerator 11 and stack 27 and pipe 28 communicates with the bottom of regenerator 11. Pipes 29 and 30 communicate with the bottom of regenerator 9. Valves for controlling the flow of gases in the system are indicated.

In employing the apparatus shown in Fig. 1 for the production of a hydrogen gas substantially free from hydrocarbons from bituminous fuel, such as bituminous coal, a bed of hot fuel in gas generator 1 is blasted by air admitted to the bottom of the fuel bed from pipe 3 through pipe 2 and the hot blast gases passed through pipe 4 into combustion chamber 19. Air from pipe 30 is passed through regenerator 9 which has been previously heated by the hot gases produced by a preceding gas-making operation in the manner described below and any combustible gas in the blast gases from pipe 4 is burned in combustion chamber 19 and the hot products of combustion passed through pipe 20 and are divided and a portion passed through regenerator 10 and another portion passed through regenerator 11 where they give up sensible heat to the refractory material therein and serve to heat the material to a high temperature. The gases from regenerator 10, after being employed in waste heat boiler 22 for the production of steam, are vented through pipe 23 and stack 24 to the atmosphere. The hot gases from regenerator 11 are vented to the atmosphere through pipe 26 and stack 27. When the fuel bed in generator 1 has been heated to a temperature at which it will decompose steam to form water gas, the air blast from pipe 3 is shut off and steam is admitted from pipe 5 through pipe 2 to the bottom of the fuel bed in generator 1 where it is decomposed by means of the highly heated fuel with the production of water gas which is taken off from the top of the generator through pipe 6 and passed through pipe 21 to the bottom of and through regenerator 10 where it is highly heated by extraction of heat from the refractory material. Simultaneously with this gas-making step, an oxygen-containing gas, preferably air from pipe 28, is passed through regenerator 11. The water gas which has been heated in regenerator 10 and contains hydrocarbons, together with water vapor which was undecomposed in its passage through the bed of fuel in generator 1, and the preheated air from generator 11, are mixed in the space above the packing material 12 and in combustion chamber 19, and a portion of the gas from regenerator 10 is burned by means of the oxygen. A combustion temperature of above about 1300° C., and preferably of about 1500° C. is maintained which induces a reaction between the hydrocarbons and steam to form carbon monoxide and hydrogen. The quantity of air employed is limited to an amount which will produce a gas containing about one volume of nitrogen to every three volumes of hydrogen and carbon monoxide. The hot gases from the reaction between the water gas, steam and air pass from combustion chamber 19 through regenerator 9 to pipe 29 whence they are conducted to a gas holder or to treatment in any desired manner for the conversion of their carbon monoxide content to hydrogen and carbon dioxide by means of steam in the presence of a catalyst. As the operation in gas producer 1 continues, the passage of steam upwardly through the fuel bed may be discontinued and steam admitted to the top of the generator from pipe 7 and passed downwardly from the fuel bed and thence through pipes 8 and 21 to regenerator 10 where it is preheated prior to the treatment with preheated air as described. When the temperature of regenerators 10 or 11 falls to a point at which the combustion temperature in chamber 19 is below about 1300° C. and a hydrocarbon-free gas is no longer satisfactorily produced, or when the temperature of the fuel bed in gas producer 1 decreases to a point at which the gas generator is no longer operating efficiently, the introduction of steam to the bed of fuel is discontinued and the fuel bed blasted with air from pipe 3 and the blast gases burned in combustion chamber 19 by means of air from pipe 30 preheated in regenerator 9 in the manner above described.

In carrying out the process above described, it has been found that a nitrogen-hydrogen gas containing one volume of nitrogen to every three volumes of hydrogen and carbon monoxide taken together and substantially free from hydrocarbons may be prepared in a practical economic manner. By suitably preheating the air employed for the combustion of the blast gases by transfer thereto of sensible heat contained in the hydrogen-nitrogen gas from the hydrocarbon decomposition step, it has been found possible to heat the refractory material in regenerators 10 and 11 to a sufficiently high temperature so that by subsequently transferring this high temperature heat to water gas from the gas generator and to air and then mixing the thus preheated gases to induce combustion of a portion of the gas, that a temperature of about 1500° C., which has been found desirable for the complete decomposition of the hydrocarbon, may be readily and efficiently obtained and maintained during the gas producing steps of the intermittently operating process above described.

Fig. 2 is a diagrammatic illustration of a process for the decomposition of natural gas in accordance with this invention. In that figure, 31, 32 and 33 indicate heat regenerators containing refractory packing material corresponding to regenerators 9, 10 and 11 respectively of Fig. 1. The upper part of regenerator 31 above the packing contained therein serves as a combustion chamber 34. A pipe 35 communicates between combustion chamber 34 and the tops of regenerators 32 and 33. A pipe 36 enters the bottom of regenerator 31 and serves for conducting air to this regenerator. A pipe 37 communicating with the bottom of regenerator 31 serves as an exit pipe for the gas produced by the decomposition of the natural gas. A pipe 38 communicates with the bottom of combustion chamber 34 above the packing in regenerator 31. Pipes 39 and 40 communicate with the bottom of regenerator 32 and pipes 41 and 42 communicate with the bottom of regenerator 33.

In employing the apparatus shown in Fig. 2 for the decomposition of natural gas to produce a gas substantially free from hydrocarbons, air from pipe 36 is introduced into regenerator 31 and passed through the refractory material therein which has been previously heated in the manner described below. A combustible gas, which may for example be natural gas, is introduced into the bottom of combustion chamber 34 where it is burned by means of the preheated air from regenerator 31 and serves to heat the combustion chamber, and the hot products of combustion pass through pipe 35 and are divided into two portions which are passed through regenerator 32 and pipe 39 and through regenerator 33 and pipe 41 respectively to the atmosphere. By burning the combustible gas in combustion chamber 34 and passing the hot products of combustion through regenerators 32 and 33, the combustion chamber and regenerators are heated to a high temperature. The introduction of air and gas to regenerator 31, and combustion chamber 34 is then discontinued and a mixture of natural gas and steam is introduced into the bottom of regenerator 32 and passed through the highly heated refractory packing material contained therein. At the same time air is introduced into the bottom of regenerator 33 and passed through the heated refractory material therein. The thus heated gases from the top of regenerators 32 and 33 are mixed and a portion of the natural gas is burned by means of the air and serves to raise the temperature of the remaining unburned portion of the natural gas to about 1500° C. At this combustion temperature of about 1500° C. the hydrocarbons are completely decomposed with the production of hydrogen and carbon monoxide, the quantity of air being limited to an amount sufficient to produce a gas product containing about one volume of nitrogen to every three volumes of hydrogen and carbon monoxide. The reaction products from combustion chamber 34 pass through the packing material in regenerator 31 and serve to heat it. When the temperature of regenerators 32 and 33 has fallen to a point at which the hydrocarbon is no longer adequately decomposed by reaction with the steam and oxygen, for example to a temperature at which the combustion temperature of the gases in chamber 34 is below about 1300° C., the introduction of air and natural gas and steam to regenerators 32 and 33 is discontinued and air is again introduced to regenerator 31 and combustible gas to combustion chamber 34 to again heat regenerators 32 and 33 to the desired high temperature.

Provision may be made for passing steam through regenerators 32, 33 and thence through regenerator 31 before reintroducing the air into regenerator 31 and combustible gas into combustion chamber 34 in order to prevent the possibility of explosions occurring at the time of changing the direction of flow of the gases therethrough. Similarly, provision may be made for introducing steam into the bottom of regenerator 31 and passing it through this regenerator and regenerators 32 and 33 after the heating period and prior to a subsequent gas-making period for the same purpose. If desired, the steam and air may be preheated as a mixture of the two in one regenerator and the hydrocarbon gas separately preheated in another regenerator. Furthermore, three regenerators may be employed for the separate preheating of both of the hydrocarbon gas and air and of the steam.

The processes described above for the decomposition of a hydrocarbon gas comprise burning a combustible gas with pre-heated air in a combustion chamber. Sensible heat contained in the hot products of combustion is recovered and transferred, a portion to a mixture of a hydrocarbon gas and steam and another portion to air to preheat the same by passing the methane and steam and the air vertically upwards through zones of increasing temperature in heat regenerators. The thus heated hydrocarbon-steam mixture, in which a large portion of the hydrocarbon has been decomposed during its passage in contact with the hotter portions of refractory material in the regenerator, and the preheated air are mixed and as a result of incomplete combustion of a portion of the hydrocarbon gas, the mixture is heated to a high temperature of about 1500° C. whereby the hydrocarbon is substantially completely decomposed by means of the steam and oxygen and a gaseous product formed containing nitrogen, hydrogen and carbon monoxide and substantially free from hydrocarbons. The amount of air employed is preferably regulated to produce a gaseous product containing about one volume of nitrogen to every three volumes of hydrogen and carbon monoxide taken together. Sensible heat contained in the hot products of the reaction is recovered by passing them vertically downwards through a zone of decreasing temperature in a heat regenerator and the heat thus recovered is transferred to air which is subsequently employed for burning a combustible gas to produce heat required for the reaction of a subsequent portion of hydrocarbon gas, steam and air. Thus, in the described process, the flow of the gases, before, during and after the reaction, takes place substantially wholly in a vertical direction.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense. It will likewise be apparent to one skilled in the art that by suitable control of the conditions of operation of the above described process, a gas may be prepared which is particularly suitable for catalytic treatment to produce alcohols or acids (for example methanol or acetic acid), and the appended claims are intended to include within their scope such modifications of the particular process described.

It is apparent to one skilled in this art that air enriched with oxygen may be employed for the incomplete combustion of the hydrocarbon gas in place of air. Furthermore, if a gas free from nitrogen is desired, relatively pure oxygen may be employed for this incomplete combustion of the hydrocarbon gas. If desired, regenerators 9 or 31 or combustion chambers 19 or 34 may contain a material adapted to catalyze the reaction between a hydrocarbon and steam.

We claim:

1. The process of producing a hydrogen gas which comprises blasting a hot bed of bituminous fuel with air, burning the blast gases with preheated air, recovering sensible heat contained in the products of combustion, introducing steam into the thus heated bed of fuel, transferring a portion of the aforesaid sensible heat to the reaction products of the steam and fuel, transferring another portion of said sensible heat to a gas containing oxygen to preheat the same, introducing the thus heated gases into a combustion chamber wherein a portion of the constituents of said reaction products are burned by the oxygen containing gas, maintaining a combustion temperature of about 1500° C. by regulating the degree of preheat of the gases introduced into said combustion chamber, recovering sensible heat from the products formed by reaction of said gases, and employing the heat thus recovered for preheating air used for burning the blast gases from a succeeding blasting with air of the aforesaid bed of fuel.

2. In combination in an apparatus for the production of a hydrogen gas, a gas generator and at least three heat regenerators associated with said generator by means of gas conduits arranged to pass gases in successive periods of operation from said generator through a plurality but not all of said heat regenerators in parallel and from said generator in series through a part of said plurality of regenerators and a heat regenerator not comprised in the said plurality of heat regenerators.

3. The process of producing a hydrogen gas which comprises blasting a hot bed of bituminous fuel with air, burning the blast gases with preheated air, recovering sensible heat contained in the products of combustion, introducing steam into the thus heated bed of fuel, transferring a portion of the aforesaid sensible heat to the reaction products of the steam and fuel, transferring another portion of said sensible heat to a gas containing oxygen to preheat the same, introducing the thus heated gases into a combustion chamber wherein a portion of the constituents of said reaction products are burned by the oxygen containing gas, maintaining a combustion temperature of above 1300° C. to decompose the hydrocarbon content of said reaction products by regulating the degree of preheat of the gases introduced into said combustion chamber, recovering sensible heat from the products formed by reaction of said gases, and employing the heat thus recovered for preheating air used for burning the blast gases from a succeeding blasting with air of the aforesaid bed of fuel.

DWIGHT C. BARDWELL.
FRANK PORTER.